(12) United States Patent
Hirokawa et al.

(10) Patent No.: US 6,753,032 B1
(45) Date of Patent: Jun. 22, 2004

(54) VEGETABLE STEROL-CONTAINING FAT COMPOSITIONS AND PROCESS FOR PRODUCING THE SAME

(75) Inventors: Toshiyuki Hirokawa, Tokyo (JP); Kazuaki Suzuki, Tokyo (JP); Shoji Maruzeni, Tokyo (JP)

(73) Assignee: Asahi Denka Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/979,660

(22) PCT Filed: May 22, 2000

(86) PCT No.: PCT/JP00/03268

§ 371 (c)(1),
(2), (4) Date: Nov. 26, 2001

(87) PCT Pub. No.: WO00/73407

PCT Pub. Date: Dec. 7, 2000

(30) Foreign Application Priority Data

May 26, 1999 (JP) ............................................. 11-146134
Jan. 17, 2000 (JP) ....................................... 2000-008366
Apr. 28, 2000 (JP) ....................................... 2000-131295

(51) Int. Cl.$^7$ ............................................. A23D 9/007
(52) U.S. Cl. ........................ 426/611; 426/601; 435/134; 435/135; 554/30
(58) Field of Search ................................. 426/601–603, 426/611, 612; 435/134–135; 554/30

(56) References Cited

U.S. PATENT DOCUMENTS

| | | | |
|---|---|---|---|
| 3,865,939 A | | 2/1975 | Jandacek |
| 4,976,984 A | * | 12/1990 | Yasukawa et al. ........... 426/602 |
| 5,160,759 A | * | 11/1992 | Nomura et al. ............. 426/602 |
| 6,139,897 A | * | 10/2000 | Goto et al. ................. 426/601 |
| 6,261,812 B1 | * | 7/2001 | Yamada et al. ............. 435/134 |
| 6,399,137 B1 | * | 6/2002 | Dartey et al. ............... 426/602 |
| 2002/0025370 A1 | * | 2/2002 | Sugiura et al. ............. 426/602 |

FOREIGN PATENT DOCUMENTS

| | | |
|---|---|---|
| BE | 753648 | 1/1971 |
| EP | 0 897 971 A1 | 2/1999 |
| GB | 1284814 | 8/1972 |
| JP | A 57-39736 | 3/1982 |
| JP | B2 57-26732 | 6/1982 |
| JP | A 57-206336 | 12/1982 |
| JP | A 59-147099 | 8/1984 |
| JP | A 6-606909 | 8/1994 |
| JP | 6-329588 | 11/1994 |
| JP | 11-123097 | 5/1999 |
| JP | 11-127779 | 5/1999 |

OTHER PUBLICATIONS

R. Ap. Ferrari et al., "Alteration of Steryl Ester Content and Positional Distribution of Fatty Acids on Triacylglycerols by Chemical and Enzymatic Interesterification of Plant Oils," Journal of the American Oil Chemists' Society, V. 74, 1997, pp. 93–96.

Yuji Shimada et al., "Enzymatic Synthesis of Steryl Esters of Polyunsaturated Fatty Acids," Journal of the American Oil Chemists' Society, V. 76, 1999, pp. 713–716.

* cited by examiner

Primary Examiner—Carolyn Paden
(74) Attorney, Agent, or Firm—Young & Thompson

(57) ABSTRACT

The plant sterol-containing fat composition of the present invention contains a plant sterol fatty acid ester (A); and from 10 to 70% by weight of a partial glyceride (B). It can provide a cholesterol absorption inhibiting effect, and capable of ensuring no addition of an emulsifier or a reduction in amount of the emulsifier to be added when utilized for production of fat foods in the emulsion product form such as margarines, fat spreads, and whip creams, whereby an emulsion product having no or reduced flavor characteristic of the emulsifier can be obtained.

8 Claims, No Drawings

VEGETABLE STEROL-CONTAINING FAT COMPOSITIONS AND PROCESS FOR PRODUCING THE SAME

TECHNICAL FIELD

The present invention relates to a plant sterol-containing fat composition preferably used for fat foods such as margarines, fat spreads, and whip creams.

BACKGROUND ART

A plant sterol has been known from old times to have an effect of inhibiting the absorption of a cholesterol from the small intestine, and used as a plasma cholesterol concentration reducing agent. The cholesterol is required to be dissolved in a bile acid micelle for being absorbed. However, the cholesterol less dissolves in a bile acid, and most thereof is in an emulsion state.

On the other hand, for the plant sterol, it also dissolves in a bile acid micelle in almost the same amount as with the cholesterol. Therefore, if the cholesterol and the plant sterol coexist, the amount of cholesterol to be dissolved in the bile acid micelle is reduced. Further, the absorptivity of plant sterol from the small intestine is low, so that the plant sterol remains within the small intestine lumen. Accordingly, the amount of cholesterol to be dissolved in the bile acid micelle is still limited, thereby inhibiting the absorption of cholesterol. Therefore, in the case of a human that is susceptible to the cholesterol ingested from diets, the plant sterol has been clinically utilized as an effective plasma cholesterol reducing agent.

The plant sterol is contained in vegetable oils and fats, soybean, wheat, and the like. It is ingested through daily diets, but in very small amounts. In view of the present Japanese dietary habits, about 1 to 2 g of the plant sterol is required per day for inhibiting the absorption of cholesterol from diets, and it is difficult to ingest such a large amount of the plant sterol through normal human diets.

Mention may be made of the following ones as the technologies utilizing plant sterols for fat foods.

In Japanese Patent Publication No. 57-26732, there is proposed a method in which the solubility of a plant sterol in a fat and oil is enhanced by increasing the content of a free fatty acid in the oil and fat. With this method, the solubility of the plant sterol in the oil and fat is improved, but the content of the free fatty acid in the oil and fat is high, so that the oil and fat is difficult to directly make commercially available.

In Japanese Patent Laid-Open Publication No. 59-147099, there is proposed a method in which deodorized scum is added to an edible oil and fat, and the resulting mixture is purified to increase the plant sterol content of the oil and fat, and in Japanese Patent Laid-Open Publication No. 57-39736, there is proposed an oil and fat composition to which the plant sterol extracted from an edible oil and fat by using an organic solvent has been added. The content of the plant sterol in each of the oils and fats prepared by the methods is very low, and unsatisfactory.

In Japanese Patent Laid-Open Publication No. 57-206336, there is proposed an edible oil and fat containing a plant sterol in an amount of from 0.5 to 30% by weight. However, mere mixing of the plant sterol in an oil and fat does not result in an improvement of the solubility in the oil and fat because of the low solubility of the plant sterol in the oil and fat, and hence the mixture is difficult to use for fat foods.

Thus, in actuality, the plant sterol is little used for fat foods because of its low solubility in an oil and fat.

On the other hand, there is another example in which a plant sterol is used for fat foods by being changed into a plant sterol fatty acid ester to enhance the solubility thereof in a fat or oil.

For example, a salad oil to which a plant sterol fatty acid ester has been added in an amount of from 0.5 to 10% by weight, and an oil and fat composition containing a plant stanol fatty acid ester are proposed in Belgian Patent No. 753648 and Japanese National Phase PCT Laid-Open No. 6-506909, respectively. However, each of these oil and fat compositions requires the addition of an emulsifier when used for the production of a fat food in the emulsion product form, and hence it cannot improve the flavor of the emulsion product.

In Japanese Patent Laid-Open Publication No. 11-127779, there is proposed a food product based on a fat having a specified ratio of a free plant sterol and a plant sterol fatty acid ester. However, the food product described in this publication cannot reduce the amount of the emulsifier when used for the production of a fat food in the emulsion product form.

Therefore, it is an object of the present invention to provide a plant sterol-containing fat composition capable of providing a cholesterol absorption inhibiting effect, and capable of ensuring no addition of an emulsifier or a reduction in amount of the emulsifier to be added when utilized for production of fat foods in the emulsion product form such as margarines, fat spreads, and whip creams, whereby an emulsion product having no or reduced flavor characteristic of the emulsifier can be obtained.

DISCLOSURE OF THE INVENTION

The present invention has attained the foregoing object by providing a plant sterol-containing fat composition comprising a plant sterol fatty acid ester (A); and from 10 to 70% by weight of a partial glyceride (B).

Further, the present invention provides, as the preferred method for producing the foregoing plant sterol-containing fat composition of the present invention, a process for producing a plant sterol-containing fat composition, comprising: effecting the esterification reaction of a plant sterol, and a partial glyceride and/or a triglyceride under solventless conditions by using a lipase or an alkali as a catalyst.

BEST MODE FOR CARRYING OUT THE INVENTION

Below, first, a detailed description will be given to a plant sterol-containing fat composition of the present invention.

The plant sterol constituting a plant sterol fatty acid ester of a component (A) of the plant sterol-containing fat composition of the present invention has no particular restriction, and mention may be made of, for example, plant sterols such as β-sitosterol, stigmasterol, campesterol, and Brassica sterol, and plant stanols obtained by hydrogenating these plant sterols, and one or more than one selected from these examples are used The preferred plant sterols are the ones containing one or more than one selected from β-sitosterol, β-sitostanol, campesterol, and campestanol.

The fatty acid constituting the plant sterol fatty acid ester (A) has no particular restriction, and mention may be made of preferably saturated and unsaturated fatty acids having from 4 to 24 carbon atoms. Out of these, saturated and unsaturated fatty acids having from 16 to 24 carbon atoms are preferably contained, and unsaturated fatty acids having from 16 to 24 carbon atoms are more preferably contained.

The plant sterol fatty acid ester (A) is contained in the plant sterol-containing fat composition in an amount of preferably 1% by weight or more, more preferably 3% by weight or more, and most preferably 5% by weight or more.

Whereas, a partial glyceride of a component (B) of the plant sterol-containing fat composition of the present invention denotes monoglyceride and/or diglyceride.

In the partial glyceride, the weight ratio E/F of diglyceride (E) to monoglyceride (F) is preferably 5 or more, and more preferably 6 or more. If the weight ratio E/F is less than 5, smoking tends to occur when the plant sterol-containing fat composition is used as a fat composition for cooking or frying which is heated during cooking.

The fatty acid constituting the partial glyceride (B) has no particular restriction, and mention may be made of the same fatty acids as the fatty acids exemplified above as the fatty acids constituting the plant sterol fatty acid ester (A). It is preferable that the fatty acid composition constituting the partial glyceride (B) is substantially the same as the fatty acid composition constituting the plant sterol fatty acid ester (A).

The partial glyceride (B) is contained in the plant sterol-containing fat composition in an amount of from 10 to 70% by weight, preferably from 15 to 65% by weight, and more preferably from 20 to 60% by weight. If the content of the partial glyceride (B) is less than 10% by weight, undesirably, the amount of an emulsifier to be added cannot be reduced when the composition is used for an emulsion product, so that the flavor of the emulsion product cannot be improved. On the other hand, a content of the partial glyceride (B) of more than 70% by weight undesirably entails not only a high manufacturing cost, but also the effect on the physical properties such as a slower solidifying property when the composition is used for a fat food.

The plant sterol-containing fat composition of the present invention may contain, in addition to the plant sterol fatty acid ester (A) and the partial glyceride (B), one or more than one selected from free plant sterols, free plant stanols, triglycedes, and free fatty acids.

Although the content of the free plant sterol and/or plant stanol has no particular restriction, it is preferably 5% by weight or less, more preferably 3% by weight or less, and most preferably 1% by weight or less in the plant sterol-containing fat composition of the present invention.

Although the content of the triglyceride has no particular restriction, it is preferably from 20 to 90% by weight, more preferably from 30 to 90% by weight, further more preferably from 35 to 85% by weight, and most preferably from 40 to 80% by weight in the plant sterol-containing fat composition of the present invention.

In the present invention, when the free plant sterol is contained, the weight ratio A/C of the plant sterol fatty acid ester (A) to the free plant sterol (C) is preferably 6 or more, more preferably 7 or more, further more preferably 8 or more, and most preferably 9 or more. If the weight ratio A/C is less than 6, the free plant sterol is not dissolved therein, and becomes more likely to crystallize.

In the present invention, when the triglyceride is contained, the weight ratio B/D of the partial glyceride (B) to the triglyceride (D) is preferably 4 or less, further preferably 3.5 or less, and more preferably 3 or less. If the weight ratio B/D is larger than 4, not only the manufacturing cost for concentrating the partial glyceride is impractically increased, but also the solidifying property tends to become slower when the composition is used for fat foods such as margarines.

Although the content of the free fatty acid has no particular restriction, it is preferably 0.6% by weight or less, more preferably 0.4% by weight or less, and most preferably 0.3% by weight or less in the plant sterol-containing fat composition of the present invention.

Since the plant sterol-containing fat composition of the present invention contains the plant sterol fatty acid ester (A) and from 10 to 70% by weight of the partial glyceride (B), it ensures not only the cholesterol absorption inhibiting effect, but also the reduction in amount of an emulsifier to be added or absolutely no addition thereof when used for an emulsion product.

Further, the plant sterol-containing fat composition of the present invention can be used singly or in mixture with other edible oils as shortening, margarine, and a roll-in fat for breads, for cakes, or for cookies; a fat for whip creams; a fat for mayonnaises; a fat for chocolates; a fat for cooking; a fat for frying; or the like.

Then, a description will be given to the preferred production process of the plant sterol-containing fat composition of the present invention.

With the production process of the plant sterol-containing fat composition of the present invention, the foregoing plant sterol-containing fat composition of the present invention is produced by effecting the esterification reaction of a plant sterol, and a partial glyceride and/or a triglyceride under solventless conditions by using a lipase or an alkali as a catalyst.

Examples of the partial glyceride to be used in the production process of the present invention include reaction monoglyceride, distilled monoglyceride, diglyceride, and diglyceride extracted from a natural oil and fat.

As the triglyceride to be used in the production process of the present invention, for example, mention may be made of oils and fats in which constitutive fatty acids comprise saturated fatty acids or unsaturated fatty acids having from 4 to 24 carbon atoms. Specifically, palm-based oils and fats such as a palm oil, a palm olein, a superolein, a palm stearine, and a palm intermediate melting point fraction, liquid oils such as a soybean oil, a rapeseed oil, a cotton-seed oil, a safflower oil, a sunflower oil, a high oleic sunflower oil, a high oleic safflower oil, and a rice bran oil, lauric oils such as a palm kernel oil and a coconut oil, animal fats such as a beef tallow, a lard, a fish oil, and a milk fat, synthetic oils such as MCT, hardened oils, fractionated oils, or trans-esterified oils thereof can be used singly or in mixture of two or more thereof. Out of these, the triglyceride containing, as the constitutive fatty acid, an unsaturated fatty acid having from 16 to 24 carbon atoms in an amount of preferably 30% by weight or more, more preferably 45% by weight or more, and most preferably 50% by weight or more is preferably used.

When a plant sterol and a partial glyceride and/or a triglyceride are subjected to an esterification reaction under solventless conditions by using a lipase or an alkali as a catalyst, if required, one or more than one selected from fatty acid lower alcohol esters and fatty acids may be added to the partial glyceride and/or the triglyceride.

Although the fatty acid lower alcohol ester has no particular restriction, it is preferably the one in which the fatty acid moiety is preferably a saturated or an unsaturated fatty acid having from 4 to 24 carbon atoms, and more preferably a saturated or an unsaturated fatty acid having from 16 to 24 carbon atoms, and the alcohol moiety is such a lower alcohol that the free alcohol for hydrolysis with ethanol, methanol, or the like has a boiling point of 100° C. or less.

Although the fatty acid has no particular restriction, it is preferably a saturated or an unsaturated fatty acid having from 4 to 24 carbon atoms, and more preferably a saturated or an unsaturated fatty acid having from 16 to 24 carbon atoms.

In the present invention, the mixing ratios of the plant sterol, the partial glyceride and/or the triglyceride, and the fatty acid and/or the fatty acid lower alcohol ester preferably fall within the following range.

The respective components are preferably mixed in such a ratio that $(7a-9b)/10 \leq c$, and more preferably in such a ratio that $(4a-3b)/5 \leq c$, where a denotes the number of moles of the plant sterol; b, the number of moles of the partial glyceride and/or the triglyceride; and c, the number of moles of the fatty acid and/or the fatty acid lower alcohol ester.

If c (the number of moles of the fatty acid and/or the fatty acid lower alcohol ester) is less than $(7a-9b)/10$, the free plant sterol remains, so that the formation ratio of the plant sterol fatty acid ester tends to be reduced.

Especially, the mixing ratios of the plant sterol and the partial glyceride and/or the triglyceride when the esterification reaction is effected by using the plant sterol, and the partial glyceride and/or the triglyceride are preferably 99 to 65% by weight of the partial glyceride and/or the triglyceride and 1 to 35% by weight of the plant sterol, more preferably 95 to 65% by weight of the partial glyceride and/or the triglyceride and 5 to 35% by weight of the plant sterol, and most preferably 90 to 75% by weight of the partial glyceride and/or the triglyceride and 10 to 25% by weight of the plant sterol. If the amount of the plant sterol to be mixed is larger than 35% by weight, an unreacted plant sterol remains, so that the mouth melting properties tend to be deteriorated, whereas if less than 1% by weight, the cholesterol absorption inhibiting effect is difficult to exert.

Although the lipase to be used as a catalyst in the production process of the present invention has no particular restriction, the one having no positional selectivity is preferably used. Specifically, enzymes obtained from Alcaligenes sp., Chromobacterium sp., Pseudomonas sp., and Humicola sp. and the like are preferred. Out of these, the enzymes obtained from Alcaligenes sp., Chromobacterium sp., and Pseudomonas sp. are more preferred, and the enzymes obtained from Alcaligenes sp. are most preferred. Although it is also possible to use these enzymes just as in the enzyme powder form, it is also acceptable to immobilize them on carriers such as diatomaceous earth, alumina, ion exchange resin, active carbon, and ceramics for use. Further, in the present invention, the lipase is preferably used in the solid form, i.e., in the powder form or the form immobilized on the aforesaid carrier, but it is not preferable that the lipase is used in the aqueous solution form.

Further, when the mixture of the plant sterol, and the partial glyceride and/or the triglyceride is subjected to an esterification reaction under solventless conditions, the esterification reaction is desirably effected such that the transesterification activity of the lipase to be used is preferably 0.4 mol/(hr·kg) or more, and most preferably 0.5 mol/(hr·kg) or more.

In the present invention, when the mixture of the plant sterol, and the partial glyceride and/or the triglyceride is subjected to an esterification reaction by using a lipase having no positional selectivity as a catalyst under solventless conditions, the reaction is preferably effected such that (2-position fatty acid change ratio)/(transesterification ratio) is preferably 0.4 or more, more preferably 0.5 or more, and most preferably 0.6 or more.

Although the amount of the lipase to be used differs according to the activity of the lipase, it is preferably from 0.03 to 10 parts by weight, more preferably from 0.03 to 5 parts by weight, and most preferably from 0.05 to 3 parts by weight per 100 parts by weight of the mixture of the plant sterol, the partial glyceride and/or the triglyceride, and the fatty acid and/or the fatty acid lower alcohol ester.

In the present invention, the esterification reaction using a lipase is performed under solventless conditions. The solventless approach eliminates the necessity to carry out desolvation after the esterification reaction. The reaction temperature is preferably from 45 to 100° C., more preferably from 55 to 90° C., and most preferably from 60 to 80° C. If the reaction temperature is less than 45° C., the reaction is less likely to occur completely, whereas if more than 100° C., the deactivation of the enzyme is ineffectively large.

In the esterification reaction using the lipase, the moisture content of the reaction system of the esterification reaction is desirably set at preferably 900 ppm or less, and more preferably 500 ppm or less, because the hydrolysis of a reaction oil can be reduced as much as possible, and the loss in a deodorizing process can be reduced as much as possible.

The esterification reaction using a lipase in the present invention can be accomplished through a batch reaction of a batch type, a semi-continuous reaction, or a continuous reaction with a column or the like. Especially, it is preferable to perform the esterification reaction through a batch reaction of a batch type, because the reaction temperature can be reduced, so that the thermal deactivation of the enzyme and the oxidative degradation of the oils and fats can be inhibited, or to perform the esterification reaction under reduced pressure because of its easiness.

For the column reaction, the reaction temperature is preferably set at 65° C. or more. Further, in the column reaction, the solution in which the mixture of the plant sterol, the partial glyceride and/or the triglyceride, and the fatty acid and/or the fatty acid lower alcohol ester has been completely dissolved must be passed therethrough. The reaction temperature is increased with an increase in the amount of the plant sterol to be added. For example, it is set at 65° C. or more when the amount of the plant sterol to be mixed is less than 10% by weight, at 70° C. or more when it is from not less than 10% by weight to less than 25% by weight, and at 80° C. or more when it is between 25% by weight and 35% by weight, both inclusive, based on the amount of the mixture of the plant sterol, the partial glyceride and/or the triglyceride, and the fatty acid and/or the fatty acid lower alcohol ester.

On the other hand, for the batch reaction of a batch type, the reaction temperature is preferably set at from 45 to 65° C. With the batch reaction, when the mixture of the plant sterol, the partial glyceride and/or the triglyceride, and the fatty acid and/or the fatty acid lower alcohol ester is completed dissolved, the reaction is faster, but even when it is not dissolved completely, the reaction can be effected. This is attributable to the following fact. That is, even if there remains some undissolved plant sterol in the mixture of the plant sterol, the partial glyceride and/or the triglyceride, and the fatty acid and/or the fatty acid lower alcohol ester, other dissolved plant sterol reacts to become the plant sterol fatty acid ester. Since the plant sterol fatty acid ester has a high solubility in the partial glyceride and/or the triglyceride, and the fatty acid and/or the fatty acid lower alcohol ester, another plant sterol equal in amount to the reacted one further dissolves. This step is repeated, so that the plant sterol in the mixture of the plant sterol, the partial glyceride and/or the triglyceride, and the fatty acid and/or the fatty acid lower alcohol ester is completely changed into the plant sterol fatty acid ester. Therefore, in the batch reaction, it is possible to set the reaction temperature lower than that in the column reaction.

Alternatively, the following procedure is also acceptable. That is, after completely dissolving the mixture of the partial glyceride and/or the triglyceride, and the fatty acid and/or the fatty acid lower alcohol ester, the plant sterol is added thereto little by little to effect the esterification reaction by using a lipase as a catalyst under solventless conditions. Upon completion of the reaction, the esterification reaction can be carried out with a further addition of the plant sterol thereto by using a lipase as a catalyst under solventless conditions.

Whereas, when the esterification reaction is accomplished by using an alkali as a catalyst, sodium methylate is preferably used. When sodium methylate is used as a catalyst, desirably, the mixture of the plant sterol, and the partial glyceride and/or the triglyceride is heated to from 80 to 100° C. to be dehydrated to a moisture content of 500 ppm or less. Thereafter, the catalyst is added thereto to effect the esterification reaction under normal pressure or reduced pressure. Upon completion of the esterification reaction, neutralization with acids such as a citric acid and a phosphorus acid, washing, and dehydration are carried out.

When the esterification reaction of the present invention is carried out, use of a lipase as a catalyst is more efficient and more economical than use of an alkali catalyst.

Further, when the esterification reaction is carried out by using the lipase or alkali as a catalyst, random transesterification is preferably carried out. By carrying out the random transesterification, the plant sterol is randomly esterified with the constitutive fatty acid of the partial glyceride and/or triglyceride. Accordingly, the constitutive fatty acid of the plant sterol fatty acid ester and the constitutive fatty acid of the partial glyceride become substantially the same.

In the present invention, especially when the esterification reaction involving the fatty acid and/or the fatty acid lower alcohol ester is carried out, it is preferably carried out under reduced pressure. At this step, the esterification reaction is desirably carried out under reduced pressure of preferably 6,650 Pa (50 torr) or less, more preferably 3,990 Pa (30 torr) or less, further more preferably 2,660 Pa (20 torr) or less, and most preferably 1,330 Pa (10 torr) or less. By carrying out the esterification reaction under reduced pressure, alcohol or water resulting from the esterification reaction is converted to the vapor phase, so that dealcoholization and dehydration can be performed at the same time. By carrying out the esterification reaction under reduced pressure, the esterification reaction can be carried out completely in the mixture of the plant sterol, the partial glyceride and/or the triglyceride, and the fatty acid and/or the fatty acid lower alcohol fatty acid ester, resulting in an increased yield of the plant sterol fatty acid ester. Unless the esterification reaction is carried out under reduced pressure, the esterification reaction cannot be carried out completely. Accordingly, a free plant sterol remains, so that the yield of the plant sterol fatty acid ester tends to be decreased. Further, unless the esterification reaction is carried out under reduced pressure, the enzyme may be deactivated by the resulting alcohol.

The plant sterol-containing fat composition thus obtained may be subjected to solvent (hexane, acetone, or the like) or dry fractionation to remove the free plant sterol.

Then, the plant sterol-containing fat composition is purified with the same purification method of ordinary oils and fats. The purification method of ordinary oils and fats herein referred to is the method in which purification is performed by carrying out bleaching and deodorizing, or deacidifying, bleaching and deodorizing.

The bleaching step is accomplished by a treatment with an absorbent such as activated clay, silica, or active carbon.

Further, the deodorizing step is generally accomplished at a deodorizing temperature as high as from 250 to 265° C., but in the present invention, it is accomplished at preferably 250° C. or less, and more preferably from 120 to 230° C. The reason for this is as follows. If the deodorizing temperature is more than 250° C., the loss of the purified plant sterol fatty acid ester tends to be increased.

Further, although the deodorizing time differs according to the deodorizing temperature and the acid value of the reaction oil, it is generally from 30 to 180 minutes.

By performing the foregoing purification, the smell characteristic of the plant sterol vanishes, and the plant sterol-containing fat composition excellent in flavor and color of the present invention can be obtained.

The formation ratio of the plant sterol fatty acid ester by the esterification reaction in the present invention is preferably from 70 to 100%, more preferably from 80 to 100%, and most preferably from 90 to 100%. It is noted that the formation ratio of the plant sterol fatty acid ester herein referred to is the value determined from:

(①/②)×100 wherein ① denotes the plant sterol content in the reaction oil (plant sterol fatty acid ester fraction) (% by weight) and ② denotes the total plant sterol content prior to the reaction (% by weight).

Below, the present invention will be described specifically by way of examples, which should not be construed as limiting the scope of the invention.

Incidentally, the transesterification activity of the lipase used in the following examples, and (exchange ratio of the 2-position fatty acid)/(transesterification ratio) are determined by the following calculation methods, respectively, and shown in Tables 1 and 2 below.

[Calculation Method of Transesterification Activity]

Into a 100-ml Erlenmeyer flask, 20 g of a raw material oil (olive oil:trimyristin=9:1) was charged, and completely dissolved at 60° C. After the raw material oil was completely dissolved, 0.2 g of an enzyme (1% by weight per oil) was added thereto to perform the transesterification reaction at a reaction temperature of 60°. Incidentally, the reaction was carried out by adjusting the moisture content of the raw material oil at 200 ppm. After 24 hours, the composition of the reaction oil was analyzed to determine the transesterification activity (mol/hr·kg) of the enzyme in the following manner.

Transesterification activity $R=(w/Mw \times Xt/100)/tW=0.138Xt/tW$ wherein:
w: weight of trimyristin (g)
Mw: molecular weight of trimyristin Xt: transesterification ratio=$(TMO-TMt)/(TMO-TMeq) \times 100$ TMO: raw material oil's trimyristin content
TMt: trimyristin content after t-hour reaction
TMeq: trimyristin content in total random calculation
t: reaction time, and
W: enzyme weight (kg).

[Calculation Method of Exchange Ratio of the 2-position Fatty Acid/Transesterification Ratio]

Into a 100-ml Erlenmeyer flask, 20 g of a raw material oil (olive oil:trimyristin=9:1) was charged, and completely dissolved at 60° C. After the raw material oil was completely dissolved, 0.2 g of an enzyme (1% by weight per oil) was added thereto to perform the transesterification reaction at a reaction temperature of 60° C. Incidentally, the reaction was carried out by adjusting the moisture content of the raw material oil at 200 ppm. After 40 hours, the composition of the reaction oil was analyzed to determine (I) transesterification ratio, and (II) exchange ratio of the 2-position fatty acid of triglyceride by the following equations, respectively, to determine (II)/(I).

Transesterification Ratio $Xt=(TMO-TMt)/(TMO-TMeq) \times 100$ wherein:
TMO: raw material oil's trimyristin content
TMt: trimyristin content after t-hour reaction, and
TMeq: trimyristin content in total random calculation Exchange Ratio of the 2-Position Fatty Acid of Triglyceride $X2t=(PO-Pt)/(PO-Peq) \times 100$ wherein:

PO: raw material oil's 2-position palmitic acid content

Pt: 2-position palmitic acid content after t-hour reaction, and

Peq: 2-position palmitic acid content in total random calculation

TABLE 1

Transesterification activity of enzyme

| Enzyme tradename | Enzyme origin | Transesterification activity |
|---|---|---|
| No. 1 Lipase QL | Alcaligenes sp. | 10.2 |
| No. 2 Lipase PLC | Same as above | 1.1 |

Lipase QL, Lipase PLC; manufactured by Meito Sangyo Co., Ltd. (Lipase QL is an enzyme powder, and Lipase PLC is an immobilized enzyme immobilized on cerite.)

TABLE 2

Exchange ratio of the 2-position fatty acid/transesterification ratio

| Enzyme tradename | (I) Transesterification ratio | (II) Exchange ratio of the 2-position fatty acid | (II)/(I) |
|---|---|---|---|
| No. 1 Lipase QL | 99% | 97% | 0.98 |
| No. 2 Lipase PLC | 95% | 62% | 0.65 |

Whereas, in the following examples, the number of moles was calculated for each component in the raw material fat and oil by using each of the following molecular weights.

| | |
|---|---|
| Triglyceride | MW884 |
| Diglyceride | MW604 |
| Plant sterol | MW414 |
| Ethyl oleate | MW310.5 |
| Methyl oleate | MW296 |
| Oleic acid | MW282 |

Further, in the following examples, the formation ratio of the plant sterol fatty acid ester was determined in the following manner.

Formation ratio of the plant sterol fatty acid ester=(①/②)×100 wherein ① denotes the plant sterol content in the reaction oil (plant sterol fatty acid ester fraction) (% by weight) and ② denotes the total plant sterol content prior to the reaction (% by weight).

The plant sterol content of the reaction oil of the forgoing item ① was measured in the following manner. Two gram of the reaction oil was fractionated with a 20-g Florisil column. The fractionation was accomplished with 150 ml of n-Hex. Whether a free plant sterol was contained in the n-Hex extract fraction, or not was confirmed. Then, the sterol contents thereof was determined. The sterol content of the n-Hex extract fraction was determined in accordance with 2.4.9.1-1996 sterol (thin layer chromatography—gas chromatography method) of the method for standard oil assay (Japan Oil Chemists's Society)

EXAMPLES 1 to 9

Into a 1-L flask, a mixture (800 g) of a fat and a plant sterol was charged, and completely dissolved at 65° C. After the mixture was completely dissolved, 16 g of a commercially available lipase, i.e., a lipase with no positional selectivity (lipase tradename: Lipase QL (Alcaligenes genus), manufactured by Meito Sangyo Co., Ltd.) was added thereto as a catalyst, and the moisture content of the reaction system was adjusted to 200 ppm to effect the transesterification reaction at a reaction temperature of 65° C. for a reaction time of 40 hours.

Table 3 below shows the formulation and the total composition prior to esterification, Table 4 below shows the number of moles of each component prior to esterification, and Table 5 below shows the total composition and the sterol composition of the plant sterol used in the reaction.

Then, after filtering out the lipase, 2% by weight of clay (however, 5% by weight only in Example 9) was added thereto to perform bleaching, followed by deodorizing at a deodorizing temperature of 200° C. to obtain a plant sterol-containing fat composition of the present invention.

Table 6 below shows the total composition and the ratios of specific components of the resulting plant sterol-containing fat composition of the present invention. Whereas, Table 7 below shows the formation ratio of the plant sterol fatty acid ester. Further, Table 8 below shows the fatty acid compositions of respective specific components of the resulting plant sterol-containing fat composition of the present invention.

As apparent from the description of Table 8 below, it is indicated that, in the plant sterol-containing fat compositions of Examples 1 to 9, the constitutive fatty acid compositions of triglyceride, diglyceride, and plant sterol fatty acid ester are substantially the same.

Further, Table 9 below shows the evaluation on the flavor and the color of the resulting plant sterol-containing fat composition.

EXAMPLE 10

Into a 1-L flask, a mixture (800 g) of a fat and a plant sterol was charged, and completely dissolved at 65° C. After the mixture was completely dissolved, 32 g of a commercially available lipase, i.e., a lipase with no positional selectivity (lipase tradename: Lipase PLC (Alcaligenes genus), manufactured by Meito Sangyo Co., Ltd.) was added thereto as a catalyst, and the moisture content of the reaction system was adjusted to 200 ppm to effect the transesterification reaction at a reaction temperature of 65° C. for a reaction time of 80 hours.

Table 3 below shows the formulation and the total composition prior to esterification, Table 4 below shows the number of moles of each component prior to esterification, and Table 5 below shows the total composition and the sterol composition of the plant sterol used in the reaction.

Then, after filtering out the lipase, 2% by weight of clay was added thereto to perform bleaching, followed by deodorizing at a deodorizing temperature of 200° C. to obtain a plant sterol-containing fat composition of the present invention.

Table 6 below shows the total composition and the ratios of specific components of the resulting plant sterol-containing fat composition of the present invention. Whereas, Table 7 below shows the formation ratio of the plant sterol fatty acid ester. Further, Table 8 below shows the fatty acid compositions of respective specific components of the resulting plant sterol-containing fat composition of the present invention.

As apparent from the description of Table 8 below, it is indicated that, in the plant sterol-containing fat composition of Example 10, the constitutive fatty acid compositions of triglyceride, diglyceride, and plant sterol fatty acid ester are substantially the same.

Further, Table 9 below shows the evaluation on the flavor and the color of the resulting plant sterol-containing fat composition.

EXAMPLE 11

Into a 1-L flask, a mixture (800 g) of a fat and a plant sterol was charged, and completely dissolved at 65° C. After the mixture was completely dissolved, 16 g of a commercially available lipase, i.e., a lipase with no positional selectivity (lipase tradename: Lipase QL (Alcaligenes genus), manufactured by Meito Sangyo Co., Ltd.) was added thereto as a catalyst, and the moisture content of the reaction system was adjusted to 200 ppm to effect the transesterification reaction at a reaction temperature of 65° C. for a reaction time of 40 hours.

Table 3 below shows the formulation and the total composition prior to esterification, and Table 5 below shows the total composition and the sterol composition of the plant sterol used in the reaction.

Upon completion of the reaction, the lipase was filtered out, and the reaction oil was completely dissolved at 80° C. Then, the resulting oil was cooled down to 5° C. at a cooling rate of 5° C./hr, and then kept at 5° C. for 40 hours to crystallize a free plant sterol. The crystal and the filtrate were separated by filtration under reduced pressure. To the filtrate portion, 2% by weight of clay was added to perform bleaching, followed by deodorizing at a deodorizing temperature of 200° C. to obtain a plant sterol-containing fat composition of the present invention.

Table 6 below shows the total composition and the ratios of specific components of the resulting plant sterol-containing fat composition of the present invention. Whereas, Table 8 below shows the fatty acid compositions of respective specific components of the resulting plant sterol-containing fat composition of the present invention.

As shown in Table 8 below, it is indicated that, in the plant sterol-containing fat composition of Example 11, the constitutive fatty acid compositions of triglyceride, diglyceride, and plant sterol fatty acid ester are substantially the same.

Further, Table 9 below shows the evaluation on the flavor and the color of the plant sterol-containing fat composition of Example 11.

TABLE 3

Formulation and composition prior to esterification (unit: % by weight)

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Formulation | Rapeseed oil | 90 | 80 | 75 | | | | 90 | 80 | 80 | 75 | 60 |
| | Hardened rapeseed oil (melting point 36° C.) | | | | 80 | | | | | | | |
| | Palm oil | | | | | 80 | | | | | | |
| | Superolein | | | | | | 80 | | | | | |
| | Plant sterol | | | | | | | | | | | |
| | 1 | 10 | 20 | 25 | 20 | 20 | 20 | | | | 25 | 40 |
| | 2 | | | | | | | 10 | 20 | | | |
| | 3 | | | | | | | | | 20 | | |
| Total composition | Triglyceride | 89 | 79 | 74 | 79 | 75 | 73 | 88 | 79 | 79 | 74 | 58 |
| | Diglyceride | 1 | 1 | 1 | 1 | 5 | 7 | 1 | 1 | 1 | 1 | 2 |
| | Plant sterol fatty acid ester | | | | | | | | | 2 | | |
| | Plant sterol | 10 | 20 | 25 | 20 | 20 | 20 | 10 | 20 | 17 | 25 | 40 |
| | Others | | | | | | | | | 1 | | |

TABLE 4

Number of moles of each component prior to esterification

| Example | Plant sterol (a) | Triglyceride | Partial glyceride | Fat (b) | Fatty acid and/or fatty acid lower alcohol ester (c) | $(7a-9b)/10 \leq c$ |
|---|---|---|---|---|---|---|
| 1 | 0.19 | 0.805 | 0.013 | 0.82 | 0 | −0.61 < 0 |
| 2 | 0.39 | 0.715 | 0.013 | 0.73 | 0 | −0.38 < 0 |
| 3 | 0.48 | 0.670 | 0.013 | 0.68 | 0 | −0.28 < 0 |
| 4 | 0.39 | 0.715 | 0.013 | 0.73 | 0 | −0.38 < 0 |
| 5 | 0.39 | 0.679 | 0.066 | 0.75 | 0 | −0.40 < 0 |
| 6 | 0.39 | 0.661 | 0.093 | 0.75 | 0 | −0.40 < 0 |
| 7 | 0.19 | 0.796 | 0.013 | 0.81 | 0 | −0.60 < 0 |
| 8 | 0.39 | 0.715 | 0.013 | 0.73 | 0 | −0.38 < 0 |
| 9 | 0.33 | 0.715 | 0.013 | 0.73 | 0 | −0.43 < 0 |
| 10 | 0.48 | 0.670 | 0.013 | 0.68 | 0 | −0.28 < 0 |

TABLE 5

Total composition and sterol composition of plant sterol (unit: % by weight)

| | | Plant sterol | | |
|---|---|---|---|---|
| | | 1 | 2 | 3 |
| Total composition | Plant sterol | 99 | 98 | 84 |
| | Plant sterol fatty acid ester | | | 13 |
| | Others | 1 | 2 | 3 |
| Sterol composition | Brassica sterol | 3 | 0.4 | 6 |
| | Campesterol | 20 | 24 | 22 |

TABLE 5-continued

Total composition and sterol composition of plant sterol
(unit: % by weight)

| | Plant sterol | | |
|---|---|---|---|
| | 1 | 2 | 3 |
| Stigmasterol | 13 | 23 | 16 |
| β-sitosterol | 60 | 44 | 49 |
| Others | 4 | 8.6 | 7 |

TABLE 6

Composition and ratios of specific components of plant sterol-containing fat composition
(unit of total composition: % by weight)

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Total composition | Triglyceride | 70.9 | 48.9 | 39 | 47.8 | 47 | 45.8 | 71.9 | 47.9 | 53 | 39.9 | 24 |
| | Diglyceride | 12 | 19 | 20 | 20 | 21 | 21 | 12 | 20 | 16 | 21 | 21 |
| | Monoglyceride | 1 | 2 | 3 | 2 | 2 | 3 | 1 | 2 | 2 | 3 | 4 |
| | Plant sterol fatty acid ester | 15 | 28 | 34 | 28 | 27 | 27 | 14 | 28 | 26 | 33 | 49 |
| | Plant sterol | 1 | 2 | 3 | 2 | 2 | 3 | 1 | 2 | 2 | 3 | 1 |
| | Free fatty acid | 0.1 | 0.1 | 0.1 | 0.2 | 0.2 | 0.2 | 0.1 | 0.1 | 0.1 | 0.1 | 0.1 |
| | Others | | | 0.9 | | 0.8 | | | | 0.9 | | 0.9 |
| Ratio of specific components | A/C | 15 | 14 | 11.3 | 14 | 13.5 | 9 | 14 | 14 | 13 | 11 | 49 |
| | B/D | 0.18 | 0.43 | 0.59 | 0.46 | 0.49 | 0.52 | 0.18 | 0.46 | 0.34 | 0.6 | 1.09 |
| | E/F | 12 | 9.5 | 6.7 | 10 | 10.5 | 7 | 12 | 10 | 8 | 7 | 5.3 |

A: plant sterol fatty acid ester content
B: partial glyceride content (diglyceride content + monoglyceride content)
C: plant sterol content
D: triglyceride content
E: diglyceride content
F: monoglyceride content

TABLE 7

Formulation ratio of plant sterol fatty acid ester

| Example | Formation ratio of plant sterol fatty acid ester |
|---|---|
| 1 | 93% |
| 2 | 91% |
| 3 | 88% |
| 4 | 91% |
| 5 | 90% |
| 6 | 85% |
| 7 | 91% |
| 8 | 89% |
| 9 | 88% |
| 10 | 88% |

TABLE 8

Fatty acid composition of specific component of plant
sterol-containing fat composition (unit: % by weight)

| | | Example | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Fatty acid composition of triglyceride | C16:0 | 4 | 4 | 3 | 4 | 44 | 33 | 4 | 4 | 4 | 3 | 3 |
| | C18:0 | 2 | 2 | 2 | 13 | 5 | 4 | 2 | 2 | 3 | 2 | 2 |
| | C18:1 | 59 | 60 | 59 | 75 | 39 | 46 | 60 | 59 | 61 | 58 | 58 |
| | C18:2 | 22 | 22 | 22 | 2 | 10 | 14 | 21 | 21 | 21 | 21 | 21 |
| | Others | 13 | 12 | 14 | 6 | 2 | 3 | 13 | 14 | 11 | 16 | 16 |
| Fatty acid composition of plant sterol fatty acid ester | C16:0 | 4 | 3 | 3 | 4 | 43 | 32 | 4 | 4 | 4 | 3 | 3 |
| | C18:0 | 2 | 2 | 2 | 12 | 5 | 3 | 2 | 2 | 2 | 2 | 2 |
| | C18:1 | 57 | 58 | 59 | 76 | 38 | 47 | 59 | 60 | 60 | 60 | 59 |
| | C18:2 | 22 | 23 | 21 | 2 | 11 | 14 | 22 | 21 | 22 | 21 | 21 |
| | Others | 15 | 14 | 15 | 6 | 3 | 4 | 13 | 13 | 12 | 12 | 15 |
| Fatty acid composition of | C16:0 | 4 | 4 | 4 | 4 | 43 | 33 | 4 | 4 | 4 | 4 | 4 |
| | C18:0 | 2 | 2 | 2 | 13 | 4 | 3 | 2 | 2 | 2 | 2 | 2 |

TABLE 8-continued

Fatty acid composition of specific component of plant sterol-containing fat composition (unit: % by weight)

|  |  | Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| diglyceride | C18:1 | 58 | 57 | 58 | 75 | 39 | 47 | 60 | 59 | 59 | 59 | 58 |
|  | C18:2 | 22 | 13 | 22 | 2 | 12 | 13 | 22 | 22 | 21 | 21 | 22 |
|  | Others | 14 | 14 | 14 | 6 | 2 | 4 | 12 | 13 | 14 | 14 | 14 |

TABLE 9

Evaluation

|  |  | Example | | | | | | | | | | |
|---|---|---|---|---|---|---|---|---|---|---|---|---|
|  |  | 1 | 2 | 3 | 4 | 5 | 6 | 7 | 8 | 9 | 10 | 11 |
| Flavor | | A | A | A | A | A | A | A | A | B | B | B |
| Color | R/Y | 0.8/2.6 | 0.8/2.7 | 1.0/2.9 | 0.9/2.3 | 1.5/3.5 | 1.9/4.2 | 0.9/2.5 | 1.1/2.9 | 1.8/5.1 | 0.8/2.9 | 1.1/3.0 |
|  | 10 R + Y | 10.6 | 10.7 | 12.9 | 11.3 | 18.5 | 23.2 | 11.5 | 13.9 | 23.1 | 10.9 | 14.0 |
|  |  | A | A | A | A | A | B | A | A | B | A | A |

Flavor very good: A, good: B
Color determined in Lovibond color (5.25-inch cell), R denotes red, and Y denotes yellow. Very good: A, the one satisfying 10 R + Y ≦ 20 Good: B, the one satisfying 20 < 10R + Y ≦ 50

EXAMPLE 12
(Preparation of Margarine)

20% by weight of a hardened soybean oil (melting point: 45° C.), 35% by weight of a palm oil, 30% by weight of the plant sterol-containing fat composition of Example 3, 13.3% by weight of water, 1% by weight of a common salt, 0.5% by weight of a powdered skim milk, and 0.2% by weight of a flavor were emulsified, and quenched and plasticized to form margarine.

Although an emulsifier had not been added to the resulting margarine, separation of water was not observed in either during quenching and plasticizing, or during storage (4 months). Further, since the emulsifier had not been added thereto, the flavor was also very good.

Further, the resulting margarine was measured in accordance with 2.4.9.1-1996 (thin layer chromatography—gas chromatography method) of the method for standard oil assay (Japan Oil Chemists' Society). As a result, it was found to contain 7.5% by weight of a plant sterol (on a free-form basis).

EXAMPLE 13
(Preparation of Margarine)

20% by weight of a hardened soybean oil (melting point: 45° C.), 35% by weight of a palm oil, 30% by weight of the plant sterol-containing fat composition of Example 10, 13.3% by weight of water, 1% by weight of a common salt, 0.5% by weight of a powdered skim milk, and 0.2% by weight of a flavor were emulsified, and quenched and plasticized to form margarine.

Although an emulsifier had not been added to the resulting margarine, separation of water was not observed in either during quenching and plasticizing, or during storage (4 months). Further, since the emulsifier had not been added thereto, the flavor was also very good.

Further, the resulting margarine was measured in accordance with 2.4.9.1-1996 (thin layer chromatography—gas chromatography method) of the method for standard oil assay (Japan Oil Chemists' Society). As a result, it was found to contain 7.4% by weight of a plant sterol (on a free-form basis).

EXAMPLE 14
(Preparation of Margarine)

20% by weight of a hardened soybean oil (melting point: 45° C.), 35% by weight of a palm oil, 30% by weight of the plant sterol-containing fat composition of Example 11, 13.3% by weight of water, 1% by weight of a common salt, 0.5% by weight of a powdered skim milk, and 0.2% by weight of a flavor were emulsified, and quenched and plasticized to form margarine.

Although an emulsifier had not been added to the resulting margarine, separation of water was not observed in either during quenching and plasticizing, or during storage (4 months). Further, since the emulsifier had not been added thereto, the flavor was also very good.

Further, the resulting margarine was determined in accordance with 2.4.9.1-1996 (thin layer chromatography—gas chromatography method) of the method for standard oil assay (Japan Oil Chemists' Society). As a result, it was found to contain 8.4% by weight of a plant sterol (on a free-form basis).

EXAMPLE 15
(Preparation of Fat Spread)

27.6% by weight of a hardened fish oil (melting point: 36° C.), 18.4% by weight of the plant sterol-containing fat composition of Example 3, 52.3% by weight of water, 1% by weight of a common salt, 0.5% by weight of a powdered skim milk, and 0.2% by weight of a flavor were emulsified, and quenched and plasticized to form a fat spread.

Although an emulsifier had not been added to the resulting fat spread, separation of water was not observed in either during quenching and plasticizing, or during storage (3 months). Further, since the emulsifier had not been added thereto, the flavor was also very good.

Further, the resulting fat spread was measured in accordance with 2.4.9.1-1996 (thin layer chromatography—gas chromatography method) of the method for standard oil assay (Japan Oil Chemists' Society). As a result, it was found to contain 4.6% by weight of a plant sterol (on a free-form basis).

EXAMPLE 16

(Preparation of Fat Spread)

27.6% by weight of a hardened fish oil (melting point: 36° C.), 18.4% by weight of the plant sterol-containing fat composition of Example 11, 52.3% by weight of water, 1% by weight of a common salt, 0.5% by weight of a powdered skim milk, and 0.2% by weight of a flavor were emulsified, and quenched and plasticized to form a fat spread.

Although an emulsifier had not been added to the resulting fat spread, separation of water was not observed in either during quenching and plasticizing, or during storage (3 months). Further, since the emulsifier had not been added thereto, the flavor was also very good.

Further, the resulting fat spread was measured in accordance with 2.4.9.1-1996 (thin layer chromatography—gas chromatography method) of the method for standard oil assay (Japan Oil Chemists' Society). As a result, it was found to contain 5.2% by weight of a plant sterol (on a free-form basis).

INDUSTRIAL APPLICABILITY

The plant sterol-containing fat composition of the present invention can provide a cholesterol absorption inhibiting effect, and capable of ensuring no addition of an emulsifier or a reduction in amount of the emulsifier to be added when utilized for production of fat foods in the emulsion product form such as margarines, fat spreads, and whip creams, whereby an emulsion product having no or reduced flavor characteristic of the emulsifier can be obtained.

What is claimed is:

1. A plant sterol-containing fat composition, comprising:
   a plant sterol fatty acid ester (A); from 10 to 70% by weight of a partial glyceride (B), and a free plant sterol (C), wherein the weight ratio A/C of the plant sterol fatty acid ester (A) to the free plant sterol (C) is 6 or more.

2. The plant sterol-containing fat composition according to claim 1, wherein the content of the plant sterol fatty acid ester (A) is 1% by weight or more.

3. The plant sterol-containing fat composition according to claim 1, wherein the constitutive fatty acid composition of the plant sterol fatty acid ester (A) and the constitutive fatty acid composition of the partial glyceride (B) are substantially the same.

4. The plant sterol-containing fat composition according to claim 1, further comprising a triglyceride (D), wherein the weight ratio B/D of the partial glyceride (B) to the triglyceride (D) is 4 or less.

5. The plant sterol-containing fat composition according to claim 1, wherein the partial glyceride comprises a diglyceride (E) and a monoglyceride (F), and the weight ratio E/F thereof is 5 or more.

6. A food product using the plant sterol-containing fat composition according to claim 1.

7. A process for producing a plant sterol-containing fat composition, comprising: effecting the esterification reaction of a plant sterol, and a partial glyceride and/or a triglyceride under solventless conditions by using a lipase or an alkali as a catalyst, and wherein the lipase is a lipase having no positional selectivity.

8. The process for producing a plant sterol-containing fat composition according to claim 7, wherein the moisture content of the reaction system of the esterification reaction is 900 ppm or less.

* * * * *